United States Patent [19]
DiBassie

[11] Patent Number: 5,924,753
[45] Date of Patent: Jul. 20, 1999

[54] PICKUP TRUCK BED EXTENDER

[76] Inventor: Dean R. DiBassie, 15510 Canterbury Forest Dr., Tomball, Tex. 77375

[21] Appl. No.: 09/226,025

[22] Filed: Jan. 6, 1999

[51] Int. Cl.$^6$ .................................................. B62D 33/08
[52] U.S. Cl. ........................................ 296/26.09; 296/26.1
[58] Field of Search .............................. 296/26.08, 26.09, 296/26.1, 26.11

[56] References Cited

U.S. PATENT DOCUMENTS

| | | | |
|---|---|---|---|
| 2,172,405 | 9/1939 | Powell | 296/26.09 |
| 2,490,014 | 12/1949 | Brand | 296/26.09 |
| 2,795,363 | 6/1957 | Turner | 296/26.08 |
| 4,472,639 | 9/1984 | Bianchi | 296/26 |
| 4,531,773 | 7/1985 | Smith | 296/26 |
| 5,154,470 | 10/1992 | Bringman, Jr. | 296/26 |
| 5,456,511 | 10/1995 | Webber | 296/26.09 |
| 5,468,038 | 11/1995 | Sauri | 296/57.1 |
| 5,522,685 | 6/1996 | Lessard | 296/26.09 |
| 5,700,047 | 12/1997 | Leitner et al. | 296/26 |
| 5,741,039 | 4/1998 | Habdas | 296/57.1 |
| 5,816,637 | 10/1998 | Adams et al. | 296/26.09 |
| 5,868,449 | 2/1999 | Hitchcock | 296/26.1 |

*Primary Examiner*—Gary C. Hoge
*Attorney, Agent, or Firm*—Henderson & Sturm

[57] ABSTRACT

A pickup truck bed extender consisting of two extendable side braces and an extender tailgate. The side braces are fabricated from two separate telescoping pieces adjustable for length so as to universally fit a variety of pickup trucks whether compact or full size. Each side brace bolts to the inner side of the pickup bed at a corner post. Each corner post features a square peg on the top and bottom that mates to square slots on the braces, and a latch pin secures side braces together by thrusting the pin downward through the holes in the adjoined braces and posts. The extender tailgate connects the two braces and may be adjustable in width in the same manner as the side units. A pair of side mounted support cables with quick release pins are used to prevent the extender tailgate from going past the horizontal position when opening. An extender flap could pivot from the extender tailgate, but would pivot in the forward direction to provide a floor surface when the existing tailgate is not long enough. The extender flap would have a rubber backing to prevent scratching to the existing surface of the existing tailgate.

5 Claims, 1 Drawing Sheet

PICKUP TRUCK BED EXTENDER

BACKGROUND OF THE INVENTION

1. Field of the Invention

The present invention relates to the field of truck accessories, and more particularly to a pickup truck bed extender.

2. Description of Related Art

As can be seen by reference to the following U.S. Pat. Nos. 4,472,639; 4,531,773; 5,154,470; 5,468,038; 5,700,047; 5,741,039, the prior art is replete with myriad and diverse pickup bed accessories.

While all of the aforementioned prior art constructions are more than adequate for the basic purpose and function for which they have been specifically designed, they are uniformly deficient with respect to their failure to provide a simple, efficient, and practical pickup bed extender.

As a consequence of the foregoing situation, there has existed a longstanding need for a new and improved type of pickup truck bed extender and the provision of such a construction is a stated objective of the present invention.

BRIEF SUMMARY OF THE INVENTION

Briefly stated, the present invention provides a pickup truck bed extender consisting of two extendable side braces and an extender tailgate. The side braces are fabricated from two separate telescoping pieces adjustable for length so as to universally fit a variety of pickup trucks whether compact or full size. Each side post bolts to the inner side of the pickup bed at a corner of the bed. Each corner post features a square peg on the top and bottom that mates to square slots on the braces, and a latch pin secures side braces together by thrusting the pin downward through the holes in the adjoined braces and posts. The extender tailgate connects the two braces and may be adjustable in width in the same manner as the side units. A pair of side mounted support cables with quick release pins are used to prevent the extender tailgate from going past the horizontal position when opening. An extender flap could pivot from the extender tailgate, but would pivot in the forward direction to provide a floor surface when the existing tailgate is not long enough. The extender flap would have a rubber backing to prevent scratching to the existing surface of the existing tailgate.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
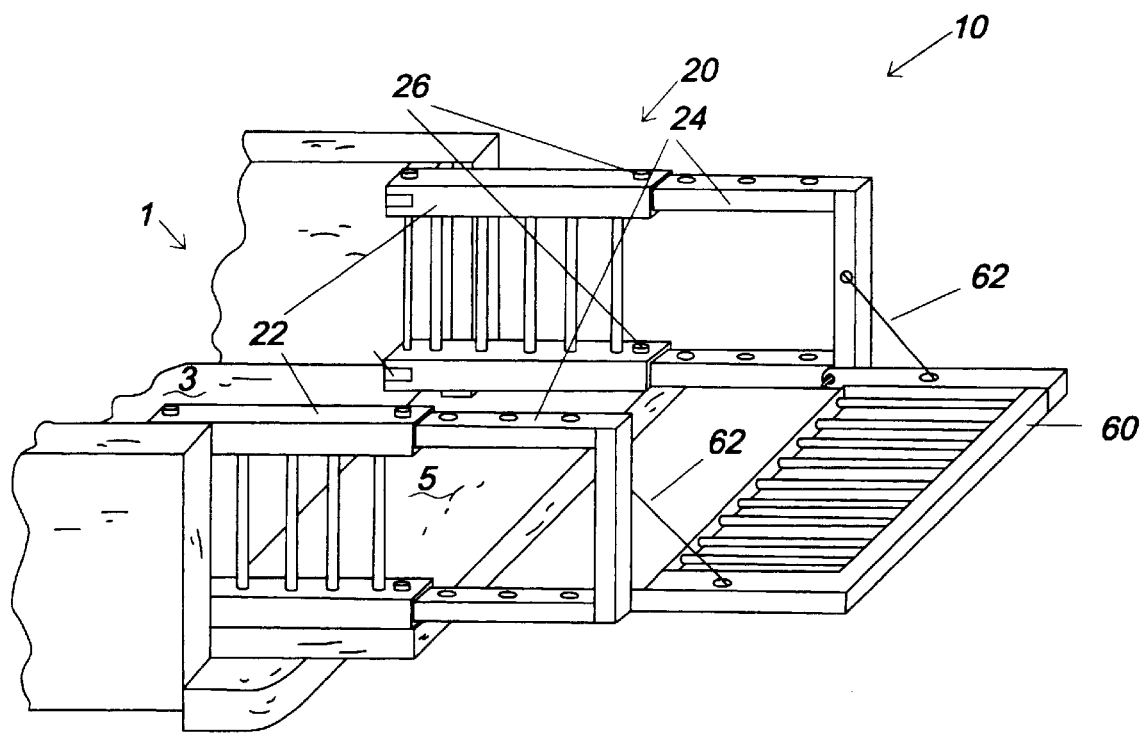
FIG. 1 is a perspective view of the pickup truck bed extender of the present invention shown in the fully extended position with the extender tailgate down.
Figure 2:
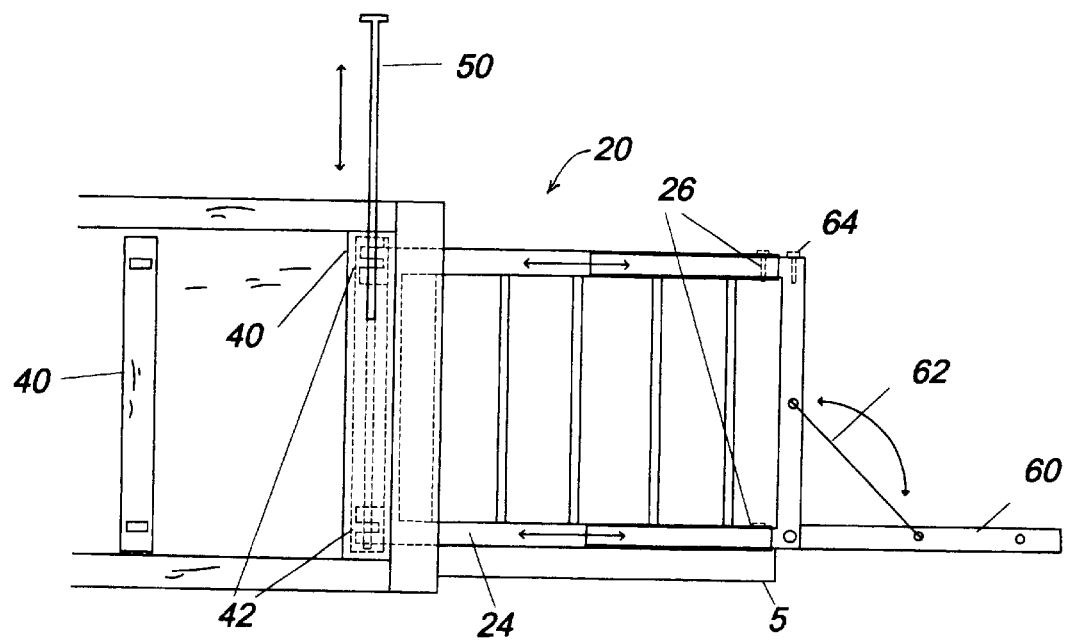
FIG. 2 is a side elevational view showing the pickup bed extender in the fully retracted position.

As can be seen by reference to the drawings, and in particularly to FIG. 1, the pickup truck bed extender that forms the basis of the present invention is designated generally by the reference number 10. The concept of the pickup truck bed extender 10 is that of a device to add a usable extension to the beds of a pickup truck 1 when the truck tailgate 5 is down.

The pickup truck bed extender 10 is a collapsible and adjustable aluminum or steel assembly that installs onto the existing opened tailgate 5 of a pickup truck 1 effectively extending the length of the bed 3 by two feet, allowing the utility of an eight foot bed with a short six foot model, or extending an eight and one-half foot bed up to ten and one-half feet.

The pickup truck bed extender 10 consists of two extendible side braces 20 and an extender tailgate 60. The braces 20 are fabricated of two separate telescoping pieces 22 and 24, allowing the assembly to be adjustable for length so as to universally fit all makes of pickup trucks 1, whether compact or full size. The side post 40 bolts to the inner side of the pickup bed 3 at the corner of the bed. Each post 40 features a square peg 42 on the top and bottom that mates to square opening slots on the side braces 20, and a latch pin 50 secures the units together by thrusting the latch pin 50 downward through holes in the adjoined brace 20 and post 40. The side braces 20 are composed of two telescoping pieces 22 and 24. One piece 22 has an opening along the length of the top and bottom horizontal bars for the other piece 24 to retract into or expand from, and is fixed to the desired length by placing a pin 26 in one of a series of adjustment holes along the horizontal bars of the interlocked pieces 22 and 24. The extender tailgate 60 which may be adjustable for width in the same manner as the side braces 20, connects to the side braces 20 with the use of a pair of quick release hinges, allowing the extender tailgate assembly 60 to be quickly removed if desired, such as when using ramps to load or unload a four wheeler. A pair of side mounted restraint cables 62 with quick release pins prevent the extender tailgate 60 from going past the horizontal position when open, and another set of quick release pins 64 mate with holes at the top of the side braces 20 to lock the extender tailgate 60 in the closed position. When installed with the existing tailgate 5 in the down position, it serves as the floor for the pickup truck bed extender 10. An extender flap could serve as an extension of the floor if the existing tailgate 5 is not long enough. The extender flap could lock up against the extender tailgate 60 until needed, and would then flip down to cover the difference between the existing tailgate 5 and the extender flap. All components have a rubber backing wherever the installed assembly touches the existing pickup truck bed 3 to prevent chaffing and scratching. A pair of reflectors could be mounted on the rear of the extender tailgate assembly 60 to provide additional safety at night.

In use, the user adjusts the length of the side braces 20 and extender tailgate 60 to match the size of the pickup truck 1 to which it was being mounted, and installs the assembly by fastening it to the corner posts 40 of the pickup bed 3. The user then enjoys the benefit of having his truck bed 3 effectively extended by approximately two feet, allow more storage space, and including a closing extender tailgate 60. The pickup truck bed extender 10 is quickly and easily removed when not required, or when ramps are being used to load or unload a four wheeler, in which case, the existing tailgate 5 would function as normal. Installation does not require modification of any existing tailgate hardware. The pickup truck bed extender 10 uses a very practical and easy installation method, allowing the owners of short wheelbase trucks or extended cab trucks, which often have short beds, to gain an extra two feet of usable cargo space. The user would have the convenience of being able to easily install or remove the assembly at will, and when removed, the components would lie flat for easy storage.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A pickup truck bed extender, comprising:

a pair of extender braces, each brace being selectively attachable to a respective inside wall of a pickup truck bed adjacent a pickup truck tailgate, each brace being telescopically movable between a retracted position extending rearwardly from the bed approximately the distance of a lowered tailgate, and an extended position extending rearwardly from the bed approximately twice the distance of a lowered tailgate; and an extender tailgate pivotally attached to and extending between an outer lower portion of the pair of braces.

2. The pickup bed extender of claim 1 wherein each brace includes an inner segment having openings formed therethrough and an outer segment having openings formed therethrough and disposed to be selectively registerable with the openings in the inner segment, and further including pins disposed to be selectively received in openings in the inner and outer segments when the openings are in registry with each other, whereby the braces are secured in one of a number of selected positions.

3. The pickup bed extender of claim 2 further including:

a pair of vertical posts attached to the pickup truck bed at opposite sides adjacent the pickup truck tailgate, each post including top and bottom pegs extending laterally out from the post, each peg having a vertical opening formed therethrough;

openings formed in an inner portion of the inner segment of each brace, the openings being disposed in registry with the vertical openings in the pegs; and a pair of latch pins, each being disposed to be received into respective openings in the pegs and braces when they are in registry to secure the braces to the pickup truck bed.

4. The pickup bed extender of claim 2 further including a cable support attached to and interconnecting one side of the extender tailgate and an outer portion of the outer segment of one of the braces.

5. The pickup bed extender of claim 4 further including a pair of cable supports.

* * * * *